(12) United States Patent
Guigné et al.

(10) Patent No.: US 8,125,850 B2
(45) Date of Patent: Feb. 28, 2012

(54) METHOD FOR IDENTIFYING GAS LEAKS USING A STATIONARY SEABED PLACED STEERED BEAMFORMED ACOUSTIC ANTENNA WITH ACTIVE NARROW BEAM TRANSMITTER INTERROGATION CAPABILITY

(75) Inventors: Jacques Y. Guigné, Paradise (CA); Nicholas G. Pace, Bath (GB); Jostein Aleksandersen, Randaberg (NO)

(73) Assignee: PanGeo Subsea, Inc., St. John's (CA)

( * ) Notice: Subject to any disclaimer, the term of this patent is extended or adjusted under 35 U.S.C. 154(b) by 183 days.

(21) Appl. No.: 12/620,628

(22) Filed: Nov. 18, 2009

(65) Prior Publication Data

US 2010/0142326 A1    Jun. 10, 2010

Related U.S. Application Data

(60) Provisional application No. 61/119,110, filed on Dec. 2, 2008.

(51) Int. Cl.
*G01S 3/80* (2006.01)
*G01M 3/24* (2006.01)

(52) U.S. Cl. ....... 367/119; 367/129; 367/153; 73/40.5 A
(58) Field of Classification Search .................. 367/118, 367/119, 129, 153; 73/40.5 A
See application file for complete search history.

(56) References Cited

U.S. PATENT DOCUMENTS

| | | | | |
|---|---|---|---|---|
| 4,241,431 A | * | 12/1980 | Jones | 367/123 |
| 4,363,112 A | * | 12/1982 | Widrow | 367/30 |
| 5,241,514 A | * | 8/1993 | Ehlers | 367/61 |
| 6,161,434 A | * | 12/2000 | Fink et al. | 73/587 |

* cited by examiner

*Primary Examiner* — Ian Lobo
(74) *Attorney, Agent, or Firm* — Richard A. Fagin

(57) ABSTRACT

A method for identifying position of acoustic source proximate sediments below the bottom of a body of water includes deploying a plurality of arrays of acoustic sensors on the bottom of the body of water. Each array includes a plurality of lines of acoustic sensors disposed in a substantially radial pattern. The arrays have a center to center distance therebetween of about twice a diameter of each of the arrays. Signals are detected from each of the sensors for a selected time period. A direction of the acoustic source with respect to each of the arrays is determined by steering a response of the sensors in each array. A range of the acoustic source is determined using the determined directions.

7 Claims, 4 Drawing Sheets

METHOD FOR IDENTIFYING GAS LEAKS USING A STATIONARY SEABED PLACED STEERED BEAMFORMED ACOUSTIC ANTENNA WITH ACTIVE NARROW BEAM TRANSMITTER INTERROGATION CAPABILITY

CROSS-REFERENCE TO RELATED APPLICATIONS

Priority is claimed from U.S. Provisional Application No. 61/119,110 filed on Dec. 2, 2008.

STATEMENT REGARDING FEDERALLY SPONSORED RESEARCH OR DEVELOPMENT

Not applicable.

BACKGROUND OF THE INVENTION

1. Field of the Invention

The invention relates generally to the field of acoustic detection of events on the bottom of a body of water. More specifically, the invention relates to devices for detecting the position and magnitude of gas leaks.

2. Background Art

Equipment disposed beneath the sea floor, such as natural gas pipelines, are subject to leaks and other faults. Such leaks can create safety hazards. It is desirable to have a system and method for precisely locating and monitoring such leaks without the need to unearth the pipeline.

International Patent Application Publication No. WO 2009/062286, the patent application for which is commonly owned with the present invention, describes an array of acoustic sensors disposed in lines traversing a radial or "star" pattern for seismic imaging of formations below the sea floor. Such arrays are beam steered to image selected points in the subsurface. The principle of such arrays may be adapted to locate pipeline leaks or other sources of acoustic noise originating near, on or below the sea floor.

SUMMARY OF THE INVENTION

A method for identifying position of an acoustic source proximate sediments below the bottom of a body of water according to one aspect of the invention includes deploying a plurality of arrays of acoustic sensors on the bottom of the body of water. Each array includes a plurality of lines of acoustic sensors disposed in a substantially radial pattern. The arrays have a center to center distance therebetween of about twice a diameter of each of the arrays. Signals are detected from each of the sensors for a selected time period. A direction of the acoustic source with respect to each of the arrays is determined by steering a response of the sensors in each array. A range of the acoustic source is determined using the determined directions.

Other aspects and advantages of the invention will be apparent from the following description and the appended claims.

DETAILED DESCRIPTION

Figure 1:
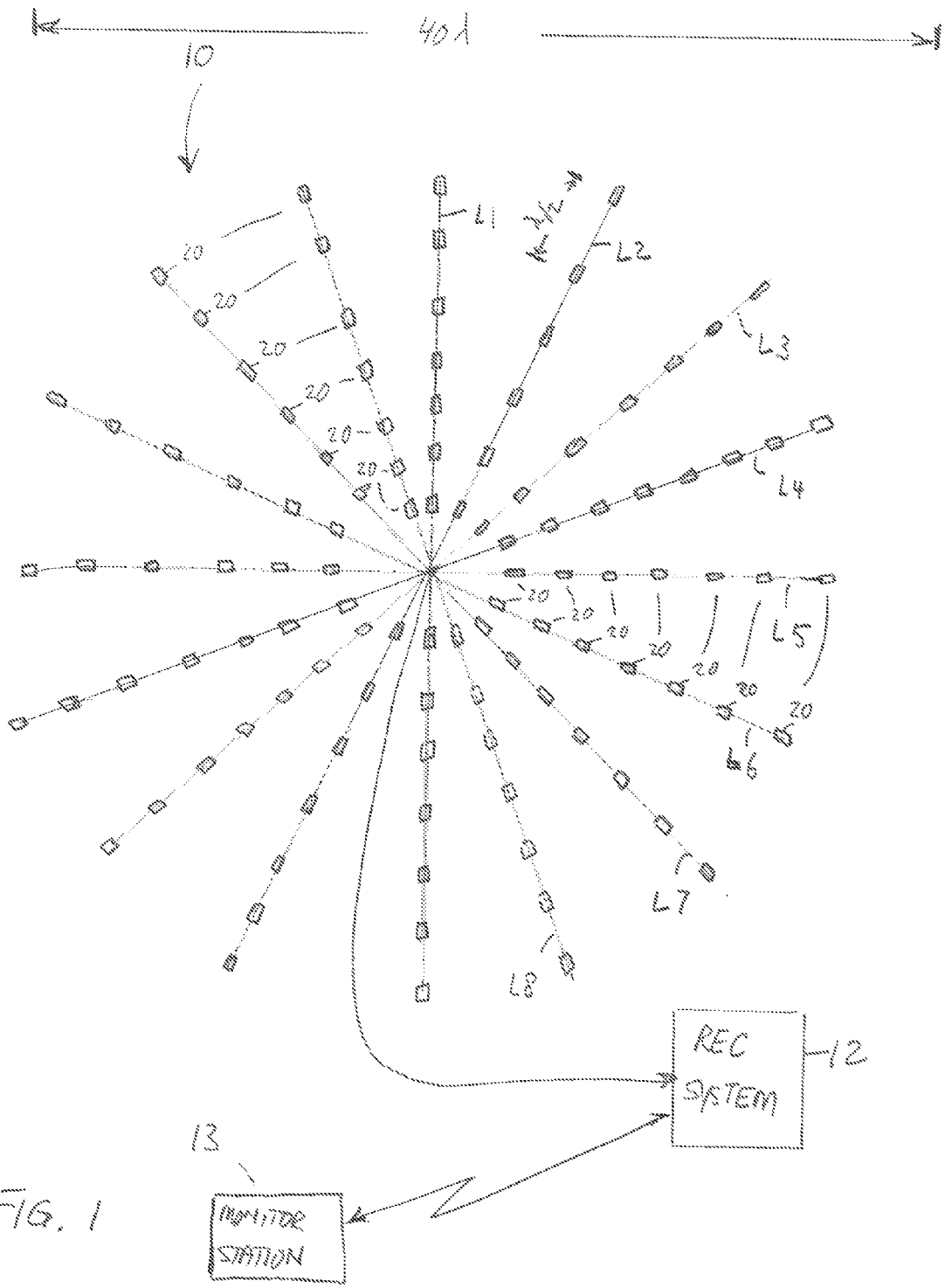
FIG. 1 shows an example of lines of acoustic sensors arranged in an array.

FIG. 1 shows schematically an example of a "star" array 10 consisting of acoustic sensors 20. A star array can consist of a selected number, eight in the present example, of lines of such sensors 20, shown at L1 through L8. Each line can have a sensor 20 disposed intervals of one-half wavelength ($\lambda/2$) of the acoustic energy to be detected thereby. In the present example each line L1-L8 can be about 40 wavelengths of the acoustic energy to be detected so there are 80 sensors per line. The lines L1-L8 are arranged in a radial pattern extending from a center of the array 10. With eight lines L1-L8 of sensors there are 640 acoustic sensors in the example array 10. Each sensor 20 can be a "four component" sensor, e.g., three orthogonally disposed, substantially collocated particle motion sensors and a substantially collocated pressure or pressure time gradient sensor. Such four component sensors are well known in the art.

The acoustic sensors 20 may be in signal communication with a recording system 12. The recording system 12 may include a data recorder for storing signals detected by the sensors in the array 10. Alternatively, the recording system 12 may include a telemetry transceiver for transmitting the signals detected by the sensors 20 to a monitoring station 13 disposed remotely from the array 10. Signal processing equipment in the recording system 12 or in the monitoring station 13 may include, for example, a computer (not shown separately) for applying selected time delays to the signals detected by each sensor 20 so that beam steering of the array 10 may be performed. The beam steering will be further explained below.

Figure 2:
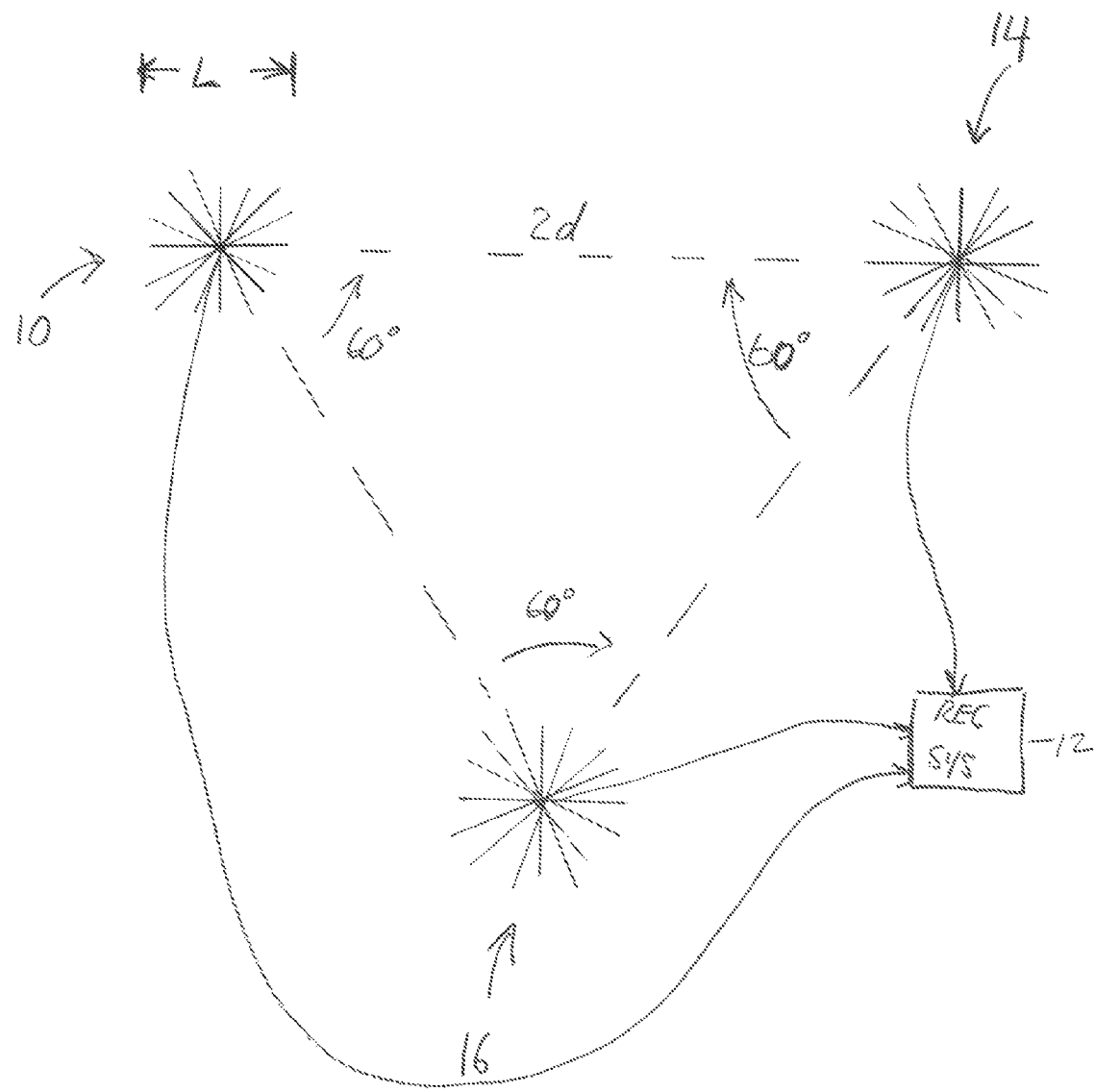
FIG. 2 shows three arrays as in FIG. 1 used to determine azimuth and range to a noise source.

FIG. 2 shows an example of three star arrays 10, 14, 16 each of which may be configured as explained with reference to FIG. 1. that can be used to detect direction and range of an acoustic noise source. In the example shown in FIG. 2, there are a total of 1920 acoustic sensors. The present example includes beam steering the sensor arrays 10, 14, 16 into, beams to investigate substantially in the horizontal plane, with a beamwidth configured to be sensitive to acoustic frequencies typically around 2 kHz. The three arrays 10, 14, 16 can be positioned in an equilateral triangle pattern subtending 60 degrees between each array 10, 14, 16 as shown in FIG. 2, and separated center to center by at least 250 meters, or twice the diameter of each array. The beams can be steered horizontally in 1 degree increments or any other selected increment over 360 degrees. Beam steering may be performed by applying suitable time delay to the signals from the individual sensors (20 in FIG. 1) in each array. As explained above, such time delay may be performed in the recording system (12 in FIG. 1) or the monitoring station (13 in FIG. 1).

Each array aperture is selected to produce beams with conical angles having −3 dB widths ($\theta_{-3\,dB}$) of the order of 1.5 degrees or less in the plane of the array and somewhat larger in the orthogonal plane Such an aperture requires focusing as well as steering which thus provides estimates of the range to the noise source obtained via triangulation from the responses of the three star locations. Focussing is performed by appropriately delaying the output of sensors before they are combined.

The lateral resolution of the steered beams decreases in proportion to the range, while the range resolution, determined passively from use of the three arrays, decreases as the square of the range. The range resolution determined from the active mode employing the parametric array remains constant with range and is determined by the transmitted signal bandwidth. Once the acoustic source is located in azimuth, the range can be determined using the triangulation approach. Using four component acoustic sensors ensures that there is no ambiguity in the position of the acoustic noise source as the sensitivity pattern of each sensor (20 in FIG. 1) in each of the three arrays 10, 14, 16 will enable identification of acoustic energy detected from a direction 180 degrees to the selected beam steer direction.

The acoustic energy arriving at the sensors in the arrays from a noise source may come either as water-borne waves or as surface waves on the water/seabed boundary. In the latter case the sound speed is slower than in water while the frequency may also be lower such that the wavelengths in the two cases are not too dissimilar. Using three star arrays disposed at fixed positions on the water bottom as shown in FIG. 2 enables the integration of received acoustic signals in each selected beam over long periods of time. Such extended detection time, in connection with the high directivity of the sensor arrays 10, 14, 16 is expected to enable relatively weak acoustic sources such as gas pipeline leak noise sources to be detected at ranges of ten kilometers or more.

The recording system (12 in FIG. 1), the monitoring station (13 in FIG. 1) or other processor or computer (not shown) can include control software to enable, as an example, 360 preformed beams for each star array to focus at a number of selected ranges to be constantly present. The beamformed and focussed output is passed through a bandpass filter, typically 500 Hz wide, squared to form the energy, which is then cumulated over time (typically 10 minutes or more). The accumulation or integration time may be adjusted both to increase the signal to noise and to reduce the confusing effect of the presence of any moving noise sources (e.g., reflected ship noise), which otherwise might dominate the detected acoustic signals. The system operator will be able to evaluate the situation from visual displays of the detected signals and can adjust the integration time accordingly. Statistics of both the received signals and the ambient noise will allow confidence levels to be extracted in terms of probabilities of detection and false alarm.

Each array could have, as explained above, by application of suitable time delays to the signals detected by the individual sensors, a steerable beam of −3 dB width of about 1.5 degrees in the horizontal plane and a larger width in the vertical plane. The receiving directivity index (DI) of such a beam would be approximately 28 dB when steered horizontally.

Figure 3:
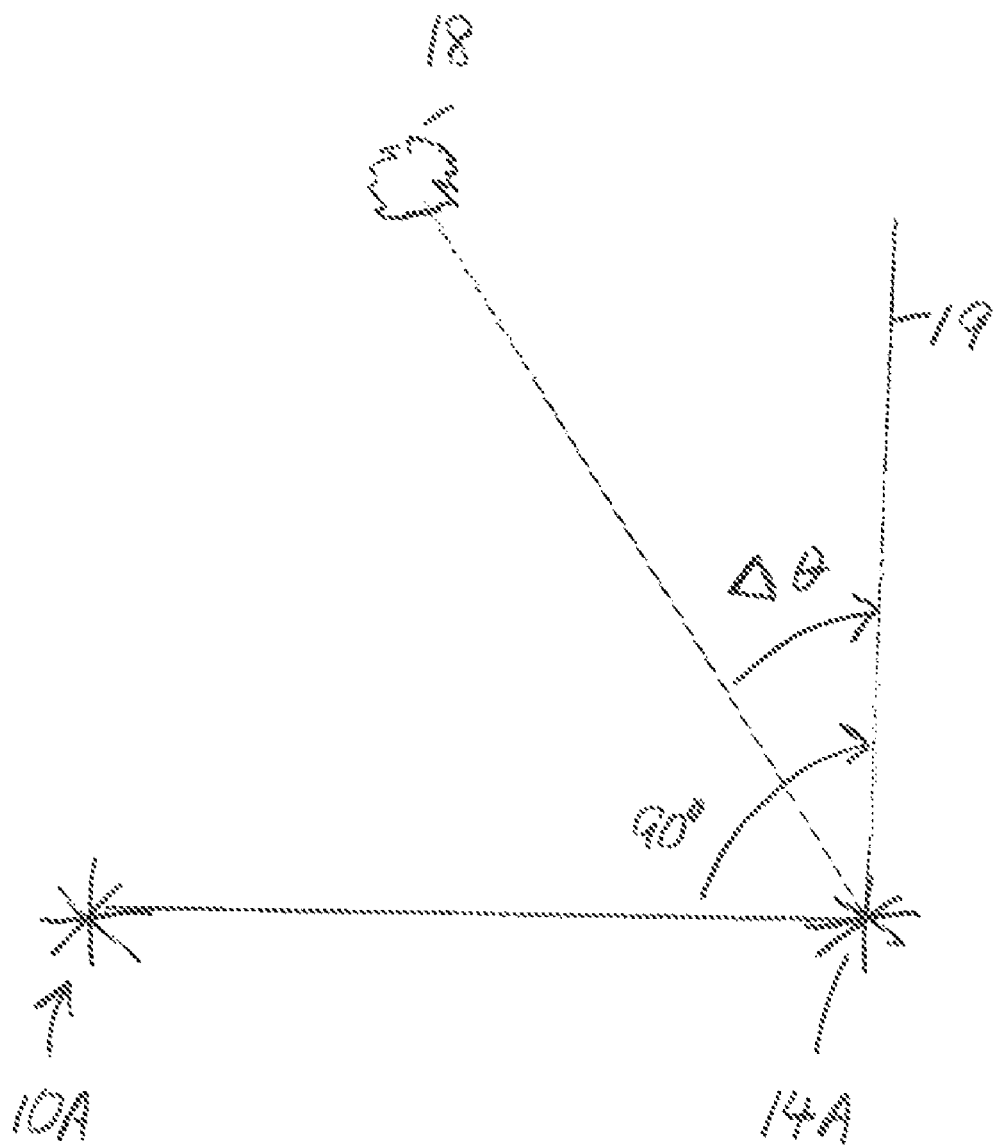
FIG. 3 shows azimuth and range calculation using two sensor arrays.

If a gas leak target (acoustic noise source) is detected then it will essentially be on-axis for specific beams, but at a different azimuth for each array. In order to clarify the explanation, and referring to FIG. 3, the following equations are for only two arrays 10A, 14A in which a noise source 18 such as a gas leak is disposed at an azimuth of $\Delta\theta$ from a line (shown at 19) transverse to the line joining the two sensor array centers. In practice, the performance of such an arrangement is a function of azimuth of the noise source with respect to the arrays 10A, 14A and with only two arrays as shown in FIG. 3 the difference in azimuth observed between the two arrays 10A, 14A falls to zero for azimuths coincident with the line joining the array centers. The performance described here for azimuths of 90 degrees using only two arrays can be essentially obtained at all azimuths if there are three star arrays as explained above with reference to FIG. 2.

The difference between the noise source azimuths determined at each array 10A, 14A provides the ability to determine the range. For example, for R=10 km and d=500 m the difference between determined azimuth at each array is about 3 degrees for 90 degree azimuth. As shown below, the azimuth has to be measured to an accuracy of about 0.07 degrees. This can be done provided both the measuring time and the signal to noise ratio are sufficient. In the present example, relatively low resolution azimuth detection may be used to locate the noise source azimuthally, and then high resolution azimuth detection within a selected range may be used to determine the range of the noise source.

The range may be determined by increasing the accuracy of the beam steering (azimuthal resolution). In the present example the resolution may be increased by changing the time sampling of the signals. If the center frequency of interest is about 2 kHz, the Nyquist sampling rate is 250 microseconds. In order to steer the beam in increments of about 0.05 degrees, the sampling rate would need to be about 0.2 microseconds. Thus, for general monitoring a relatively low sample rate (approximately the Nyquist rate) can be used to steer the beams in increments of 1 degree. When the range to a detected target is required to be determined the sampling rate can increased as suggested above, for example to steer the beams in 0.05 degree increments. To improve efficiency, the beams may be steered in the smaller increments only within a selected range of azimuth about the azimuth detected in the larger increment beam steering.

The range R is related to the array separation, which in the present example is 2d (d is half the separation of the array centers) and the difference between azimuths $\Delta\theta$ may be determined by the expression:

$$R = \frac{2d}{\sin\Delta\theta}$$

The change in R with respect to change in azimuth difference is given by the expression:

$$dR = \frac{R^2}{2d}d(\Delta\theta)$$

That is to say, the accuracy relates to the square of the range. The accuracy required for azimuth determination is not the same as how accurately it is possible to determine that there are two noise sources as opposed to one noise source. That is covered by the Rayleigh Criterion which assumes a S/N ratio of >10 dB. The azimuth accuracy is $d(\Delta\theta)$ where:

$$d(\Delta\theta) = \frac{\theta_{-3dB}}{\sqrt{(2S/N)}} \text{ Where } 10\log(S/N) = S/N \text{ dB}$$

The signal to noise S/N is noted as:

$$S/N = -3 + 20\log\left(\frac{\theta_{-3dB}}{d(\Delta\theta)}\right) \text{ dB}$$

A reasonable expectation of S/N is 20 dB which might involve time integration of up to an hour. A S/N of 20 dB gives $d(\Delta\theta)$=0.07 degrees using a −3 dB beam width of 1 degree.

Postulating that a range accuracy of five percent of the actual range is desirable then $d(\Delta\theta)$=0.07 degrees at 5 km $\Delta R$=250 m and at 10 km $\Delta R$=500 m.

$d(\Delta\theta)$ can be expressed as:

$$d(\Delta\theta) = \frac{\Delta R}{R}\frac{2d}{R} = 0.05\frac{2d}{R}$$

rads and using the value of range accuracy of 5% an estimate of what minimum value of array separation (2d) is needed to obtain such accuracy at 10 km can be obtained as $$2d = \frac{Rd(\Delta\theta)}{\Delta R/R} = 233 \text{ m at } R = 10 \text{ km with } d(\Delta\theta) = 0.07 \text{ degrees}$$

To detect 2 kHz noise source the diameter of the sensor arrays could be between about 30 and 45 m. As explained above, each 30 m diameter sensor array in the present example includes 640, 4 component sensors. The separation between the arrays would be at least 250 meters and thereby provide a range resolution 5% or less of range. The lateral azimuthal resolution would be $R\theta_{-3\,dB}$ which at 10 km would between 170 m. and 250 m depending on the choice of array diameter Obtaining such results depend on achieving a S/N of at least 20 dB. An estimate of the required source level SL of the gas leak to enable a particular S/N is derived by:

$$SL = S/N + TL + (NSL + 10 \log BW - 28) - 5 \log BWt)$$

When S/N=20 dB, NSL=60 db re 1 uPa per Hz, BW=500 Hz (see under 0016) with integration (see under 0016) time of 10 minutes and the DI of receiving array is 28 dB (40λ diameter sensor array) then for a range of 10 km SL=20+20 log 10000+(60+10 log 500-28)-5 log (500*60*10)=131 dB re 1 μpA at 1m. Estimates of the SL of the gas leak indicate that this is achievable. There is a lot of flexibility in the choice of bandwidth and integration time.

Figure 4:
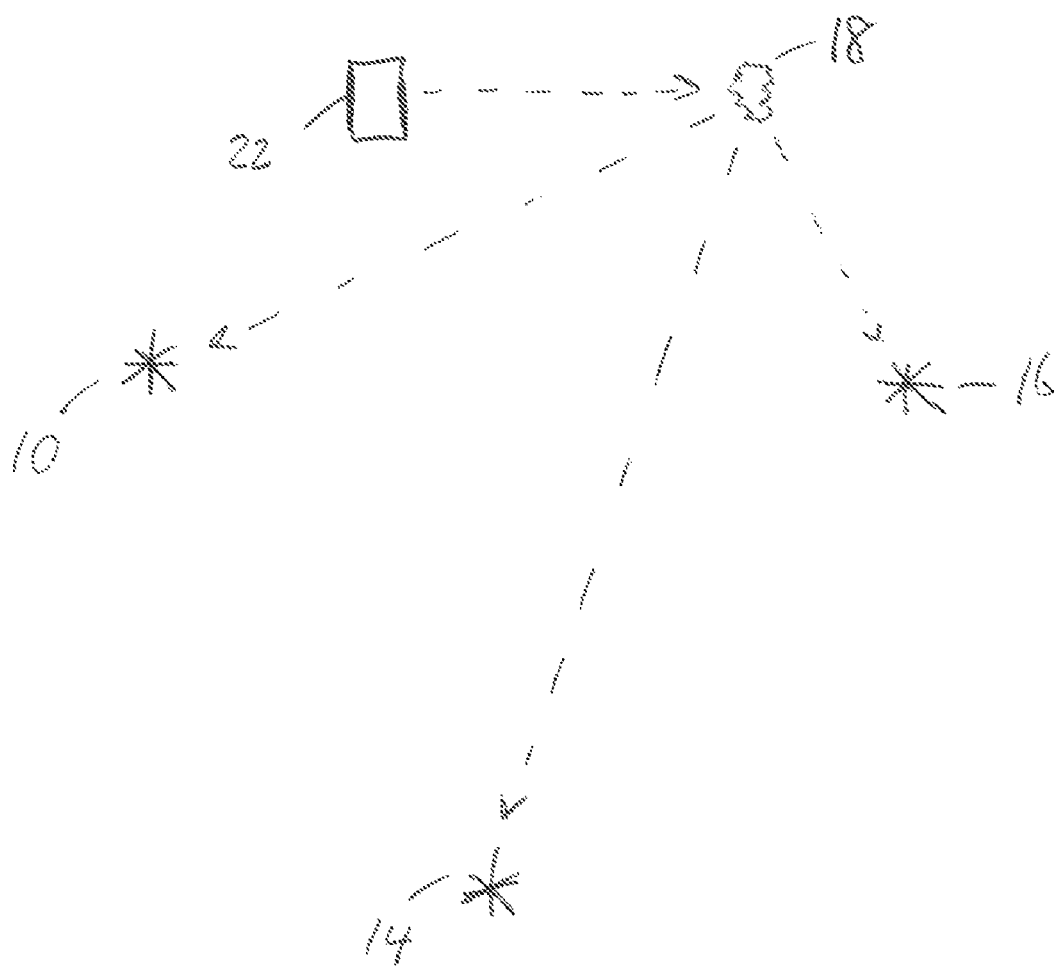
FIG. 4 shows an acoustic energy source positioned near the arrays for active interrogation of acoustic sources originating near, on or in the sea floor.

Another aspect of the present invention includes further remote interrogation of targets such as gas leakage in an active manner. The phenomenon of leaking gas should be seen as a dynamically altering situation, where the water bottom sediments proximate the gas leak can become partially or totally saturated with gas, with consequent alteration of their pore pressures. Gas saturation and pore pressure changes can result in acoustic property changes to the sediments proximate the target. Further, a column of gas bubbles in the water provide a target. In an active interrogation example, the sediments proximate any target and/or the water borne gas can be actively illuminated by transmitting acoustic energy in the direction of the target area, and capturing the scattered response using the multiple star arrays as explained above. A high power transducer that can be a parametric array is used in the present example. Such a transducer is shown in FIG. 4 at 22. It is deployed in the water column and in the vicinity of the receiving star arrays. An example parametric array is described in U.S. Pat. No. 7,196,970 issued to Moon et al. The radiated beam at the "difference frequency" (typically around 2 kHz) would have a width of about 1 degree and would result from several kilowatts of acoustic power radiated at a base frequency on the order of 20 kHz. The source level at the difference frequency is sufficient to provide a 10 dB echo to noise ratio from the cloud of gas bubbles formed by the escaping gas at a range of 10 km when reception is via a star array of diameter 40λ.

The source beam can be directed toward a possible leak 18 detected by the continuous 360 degree monitoring provided by the three arrays 10, 14, 16, and the beams of each array can be steered appropriately to receive the echoes from the source 22. At a range of 10 km, the lateral azimuthal resolution is about 120 m as there is a transmit beam of 1 degree and a receive beam of width about 1.5 degrees each giving an overall effective width of 1 degree. The range resolution is dependent on the bandwidth and a value of 100 Hz is consistent with the echo to noise of 10 dB. This gives a range resolution of about 10 m at all ranges. The source 22 can be deployed well above the seabed if required and angled down at the azimuth, determined from the passive monitoring of the arrays 10, 14, 16.

The resulting scattered returns would allow for the operator to localize in time, stacking the returns and steering the beam with more precision onto the target site thus delivering more detailed information on the behavior of the target to be captured, with the added feature of 4D monitoring of the site in real time.

A system and method according to the invention may enable detection of noise sources under the sea floor such as gas leaks.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying position of an acoustic source proximate sediments below the bottom of a body of water, comprising:
    deploying a plurality of arrays of acoustic sensors on the bottom of the body of water, each array including a plurality of lines of sensors disposed in a substantially radial pattern, the arrays having a center to center distance therebetween of about twice a diameter of each of the arrays;
    detecting signals from each of the sensors for a selected time period;
    determining a direction of the acoustic source with respect to each of the arrays by steering a response of the sensors in each array; and
    determining a range of the acoustic source using the determined directions.

2. The method of claim 1 further comprising directing acoustic energy at the source, and determining an acoustic response of the source to the directed energy.

3. The method of claim 2 wherein the acoustic response comprises changes to acoustic properties of the sediments caused by gas charging thereof.

4. The method of claim 1 wherein the acoustic source comprises a gas pipeline leak.

5. The method of claim 1 wherein the determining direction comprises selecting predetermined directions along which the steering is performed, and repeating the detecting at selected times along the predetermined directions.

6. The method of claim 1 wherein a lateral spacing between the sensors in each array is approximately one-half a wavelength of energy from the acoustic source.

7. The method of claim 1 wherein the determining range of the acoustic source comprises beam steering the sensors in each array at a first resolution to determine the direction of the acoustic source and then beam steering the sensors at a second resolution greater than the first resolution to determine direction to a higher precision.

* * * * *